United States Patent [19]

DeRosa

[11] 4,326,395
[45] Apr. 27, 1982

[54] ELECTRIC ENCLOSURE LOCKING ASSEMBLY

[76] Inventor: Pasquale A. DeRosa, 290 Winchester Ave., Staten Island, N.Y. 10312

[21] Appl. No.: 72,220

[22] Filed: Sep. 4, 1979

[51] Int. Cl.³ .................... B65D 55/14; H02G 13/14; H05K 5/03; H05K 5/04
[52] U.S. Cl. ........................................ 70/168; 70/232; 70/417; 70/DIG. 34; 70/DIG. 57; 292/DIG. 11; 174/66
[58] Field of Search ........ 70/232, DIG. 34, DIG. 57, 70/418, 417, 168, 167, 172, 171, 166, 170, 158, 77, 371; 174/66, 67; 220/3.8, 241, 327, 256, 210; 324/156; 292/DIG. 11; 361/364

[56] References Cited

U.S. PATENT DOCUMENTS

| | | | |
|---|---|---|---|
| 1,155,350 | 10/1915 | Gilson et al. | 220/241 X |
| 1,269,770 | 6/1918 | Wurdack | 324/156 X |
| 1,339,075 | 5/1920 | Toelle | 70/232 |
| 1,587,498 | 6/1926 | Beach | 70/172 X |
| 1,662,275 | 3/1928 | Lane | 174/66 X |
| 1,843,054 | 1/1932 | Weinstein | 220/3.8 X |
| 2,211,819 | 8/1940 | Innis | 174/66 X |
| 2,238,710 | 4/1941 | Shapiro | 220/241 X |
| 2,329,349 | 9/1943 | Johansson | 220/3.8 X |
| 2,709,198 | 5/1955 | Holtshouser | 70/168 X |
| 2,722,822 | 11/1955 | Thomas | 70/167 |
| 2,800,090 | 7/1957 | Reid | 70/168 X |
| 2,892,172 | 6/1959 | McGann, Jr. | 174/66 X |
| 3,031,875 | 5/1962 | Brown | 70/168 |
| 3,140,344 | 7/1964 | Slater et al. | 220/3.8 X |
| 3,200,989 | 8/1965 | Hubbell | 174/66 X |
| 3,618,804 | 11/1971 | Krause | 220/242 X |
| 3,784,727 | 1/1974 | Haubein | 70/DIG. 57 |
| 3,910,079 | 10/1975 | Gassaway | 70/232 X |
| 4,024,740 | 5/1977 | Digiovanni | 70/175 |
| 4,049,313 | 9/1977 | Lundberg | 70/77 X |
| 4,080,811 | 3/1978 | Nielsen, Jr. | 292/DIG. 11 X |
| 4,107,959 | 8/1978 | Skarzynski et al. | 292/DIG. 11 X |
| 4,144,729 | 3/1979 | Nielsen, Jr. | 70/371 X |

FOREIGN PATENT DOCUMENTS

| | | | |
|---|---|---|---|
| 1013163 | 7/1977 | Canada | 70/167 |
| 612954 | 11/1948 | United Kingdom | 324/156 |

OTHER PUBLICATIONS

"P&S 4600", Trade Literature Form No. 3229 of Pass & Seymour, Inc., in Syracuse, N.Y. 13209 (3 pages).

*Primary Examiner*—Roy D. Frazier
*Assistant Examiner*—Carl F. Pietruszka
*Attorney, Agent, or Firm*—Brooks, Haidt, Haffner & Delahunty

[57] ABSTRACT

A locking assembly for electrical enclosures to prevent unauthorized tampering with internal power connections. The locking assembly comprises an adjustable bracket which is secured to the walls of the enclosure by bolts; a cover which covers the open front and a substantial part of the sides of the enclosure and which is secured by a bolt to the adjustable bracket, a locking shield which overlies and prevents removal of the bolt which attaches the cover to the adjustable bracket, and a removable lock bolt which secures the shield to the cover.

11 Claims, 9 Drawing Figures

4,326,395

ELECTRIC ENCLOSURE LOCKING ASSEMBLY

FIELD OF THE INVENTION

The invention relates to tamper resistant devices which are employed to prevent access to utility controls or connections and particularly, to a tamper resistant, locking cover for a connection box used in the electricity supply line on a consumer's premises.

In many electrical supply systems, a bottom feed, power consumption meter with a meter pan or connection box therebelow is installed on the user's premises. Such meter pan receives the electric company supply line and encloses the interconnections between the supply line, the meter and the user's line. It may sometimes happen that the user will attempt to gain unauthorized access to the interior of the meter pan and to by-pass the meter connections thereby preventing the registration by the meter of the electricity consumption. In other cases, when the supply of electricity to the user is interrupted by the electric company within the meter pan, the user may also attempt to gain access to the interior of the meter pan and to reconnect wires so that electricity is again supplied to the user's lines without registration by the meter.

Such meter pans usually have a locked cover. However, as originally installed, the meter pan is made of metal of a relatively thin gauge. Unauthorized access to the interior of the meter pan may be obtained by bending or removing the cover. When the cover is missing, broken or otherwise damaged, it is necessary to install an overlay device before prior art types of locking devices can be installed. Such an overlay device is relatively expensive to install.

DESCRIPTION OF THE PRIOR ART

Prior art devices, such as those described in U.S. Pat. Nos. 3,968,985 and 4,107,959, employ locks which extend through the existing meter pan cover or through auxiliary locking brackets attached to the sides of the meter pan and its cover. Since original equipment meter pan covers are usually constructed of thin gauge metal, such devices are easily circumvented by bending the original cover.

The prior art of U.S. Pat. No. 2,594,012 comprises a cast meter box with integral internal tapered lugs and a cover with a multi-armed boss which engages the tapered lugs. Electric meter pans do not have said internal tapered lugs which could engage a multi-armed boss.

The device described in U.S. Pat. No. 4,024,740 comprises a tamper resistant hood assembly which attaches to a flow control valve via a grease fitting screwed into a threaded hole which is part of the original valve. Removal of the grease fitting is prevented by a locking cap. However, meter pans do not have, as an existing part thereof, an adequate point of attachment for such a locking device.

SUMMARY OF THE INVENTION

The preferred locking assembly of the invention replaces the existing thin metal meter pan cover with a cover which attaches to the orginal meter pan by means of an easily installed bracket. The substitute cover is of rugged construction to prevent bending or cutting, and yet it is secured to the meter pan by locking means so as to permit easy removal thereof and access to meter pan internal wiring by utility service persons. The locking assembly is also adaptable to many types of bottom mount type meter pans.

Generally, the substitute cover is made of heavy, preferably hardened, steel construction which spans the open front of the meter pan. The cover has a peripheral skirt and ears which protect the sides of the meter pan and prevent removal of fasteners which hold the cover attaching bracket to the meter pan. The attaching bracket comprises two metal angle members which bolt on opposite sides of the meter pan, and an adjustable transverse center plate which crosses the front opening of the meter pan and attaches to the two angle members. The cover covers the meter pan opening and attaches to the center plate by means of a bolt. Removal of the bolt is prevented by a shield which covers the bolt.

The shield has an upper rounded and beveled top edge which is placed within a well in the cover and under a lip at one end of the well. A pivotal, hinge-like motion about the shield's top edge is used to position it within the cover well. The shield is locked to the cover by a barrel lock which passes through the shield into a locking ring on the cover. The top edge of the shield is protected by the cover lip, and the other three shield edges are protected by the sides of the cover well, making it very difficult to shear the barrel lock by hammering or chiseling.

All bolts are protected from shearing or unthreading by their locations beneath the cover, or its skirt and ears, and beneath the shield. The shield, like the cover, is of heavy gauge, preferably hardened, steel construction to prevent shearing or bending.

Various objects, features, and advantages of the invention will become more apparent in the following detailed description of the preferred embodiments of the invention.

BRIEF DESCRIPTION OF THE DRAWINGS

The description should be considered in conjunction with the accompanying drawings in which:

FIG. 5 is an enlarged, fragmentary, perspective view, partly in cross-section, of the enclosure cover showing placement of the top edge of the shield under the lip at the upper end of the cover wall;

FIG. 6 is a fragmentary, side elevational, cross-section of a portion of the embodiment shown in FIG. 3 but with the shield partially removed;

FIG. 8 is a fragmentary, front elevational view of the shield as it appears when locked in place in the cover well;

FIG. 9 is a fragmentary, sectional, plan view through the cover and meter pan and is taken along the line 9—9 indicated in FIG. 1.

DESCRIPTION OF THE PREFERRED EMBODIMENTS

Figure 1:
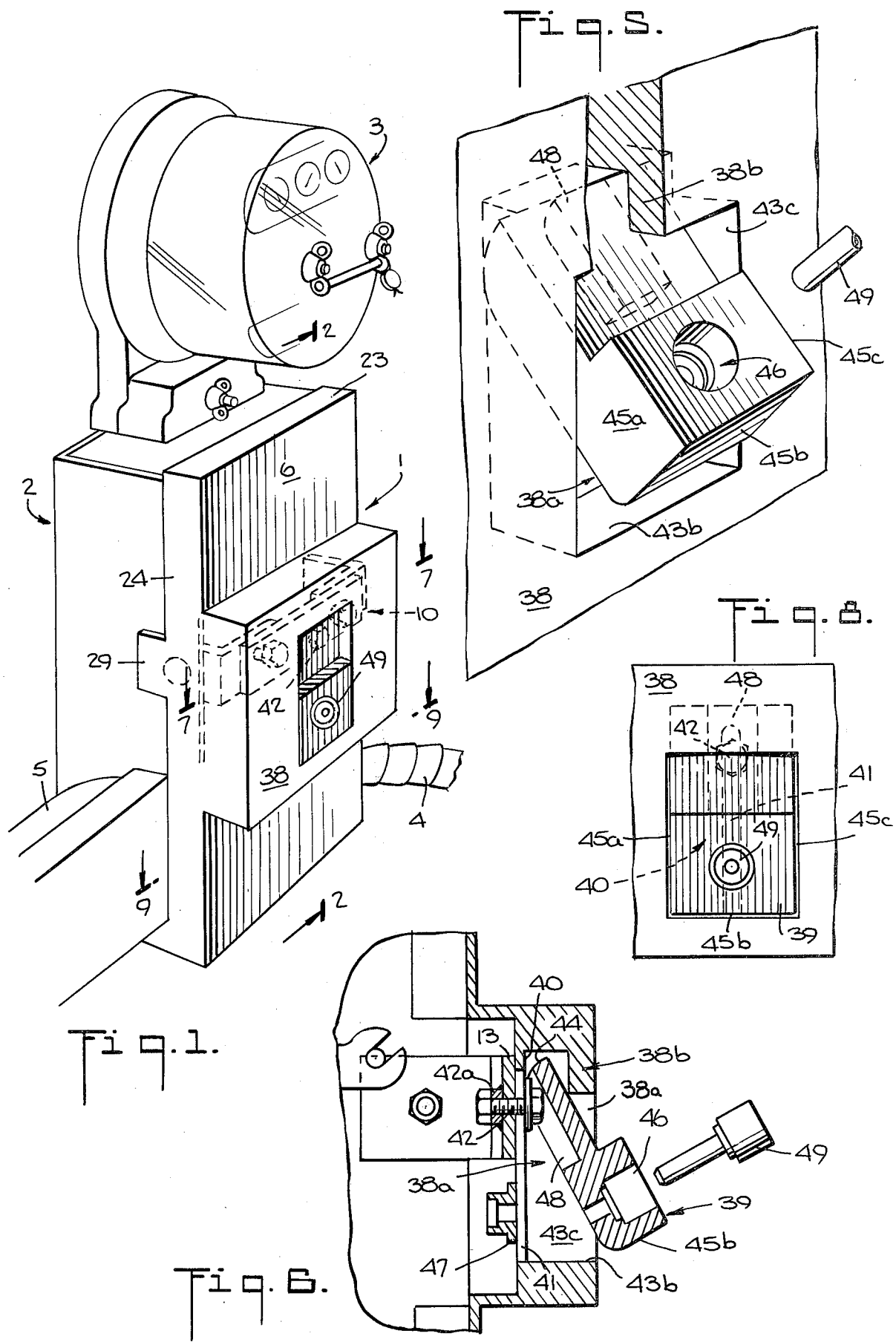
FIG. 1 is a perspective view of the electrical enclosure locking assembly of the invention as it appears when locked in place on a bottom mount electric meter pan.

FIG. 1 illustrates the locking assembly 1 of the invention attached to the meter pan 2 of a bottom feed, watthour meter 3. The entrance line 4 enters one side of the pan 2, and the consumer's line exits from the pan 2 from a sidewall thereof, such as by way of the conduit 5. The locking assembly 1 replaces the relatively thin gauge cover (not shown) which usually is supplied when the meter 3 and the pan 2 are initially installed.

Figure 2:
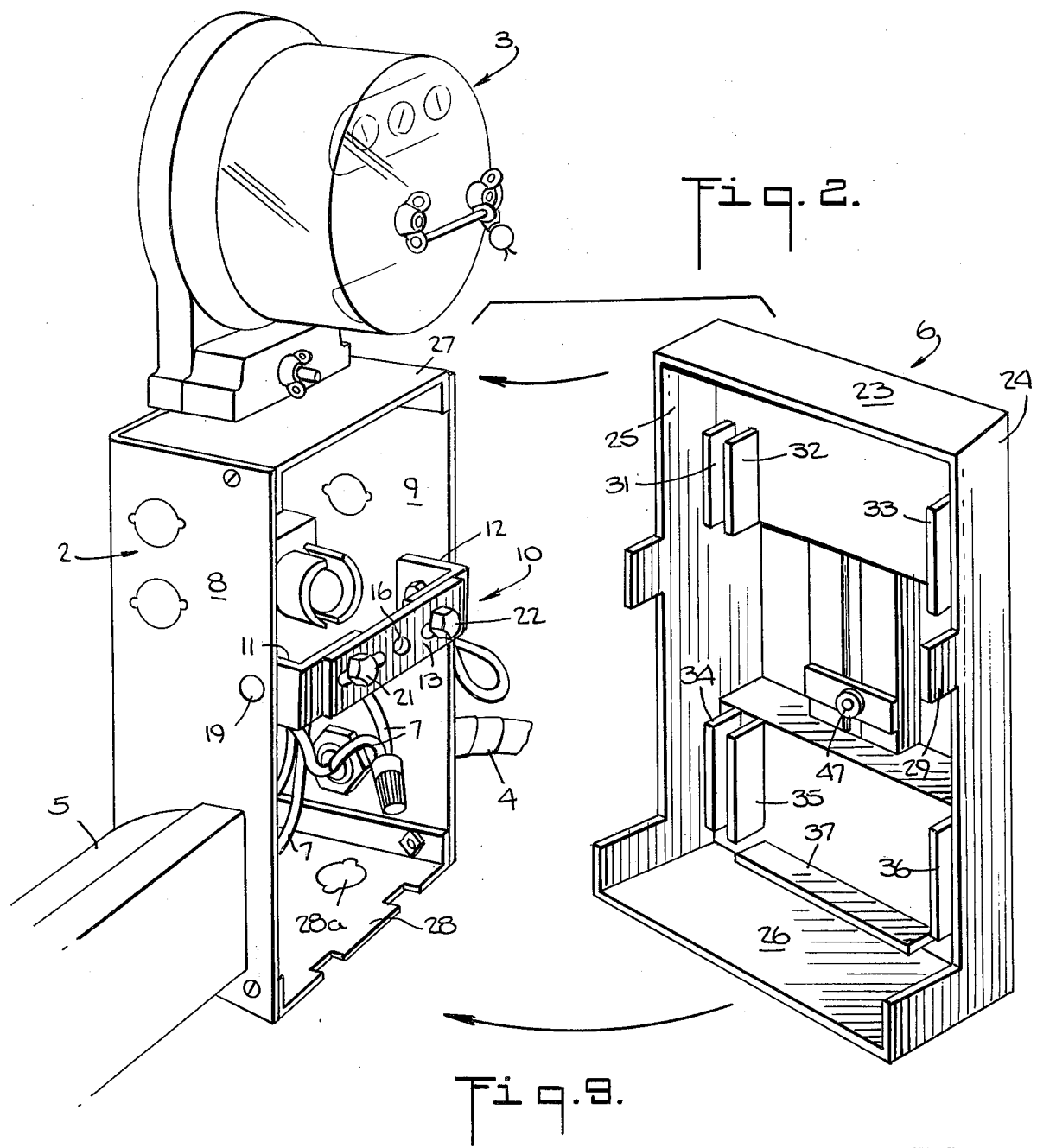
FIG. 2 is a perspective view of the electric meter pan with the bracket assembly installed and of the rear of the hardened heavy gauge cover removed from the pan.
Figure 3:
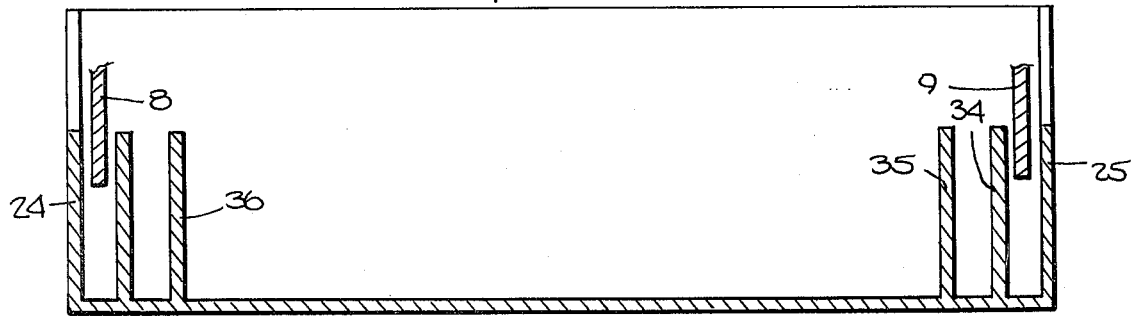
FIG. 3 is an enlarged, cross-sectional, side elevation view of a portion of the embodiment shown in FIG. 1 mounted on a wall and is taken along the line 2—2 indicated in FIG. 1.
Figure 3:
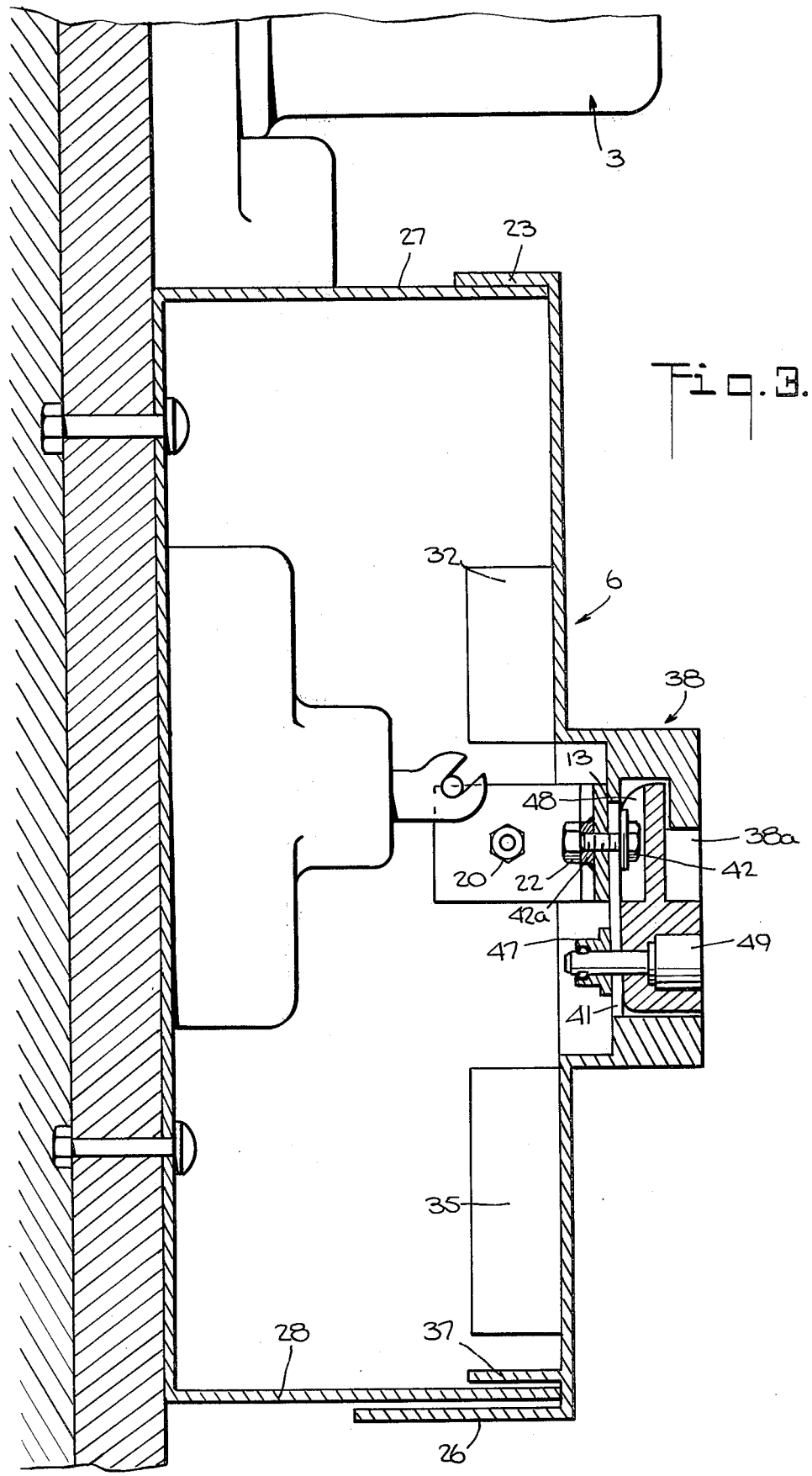
Figure 4:
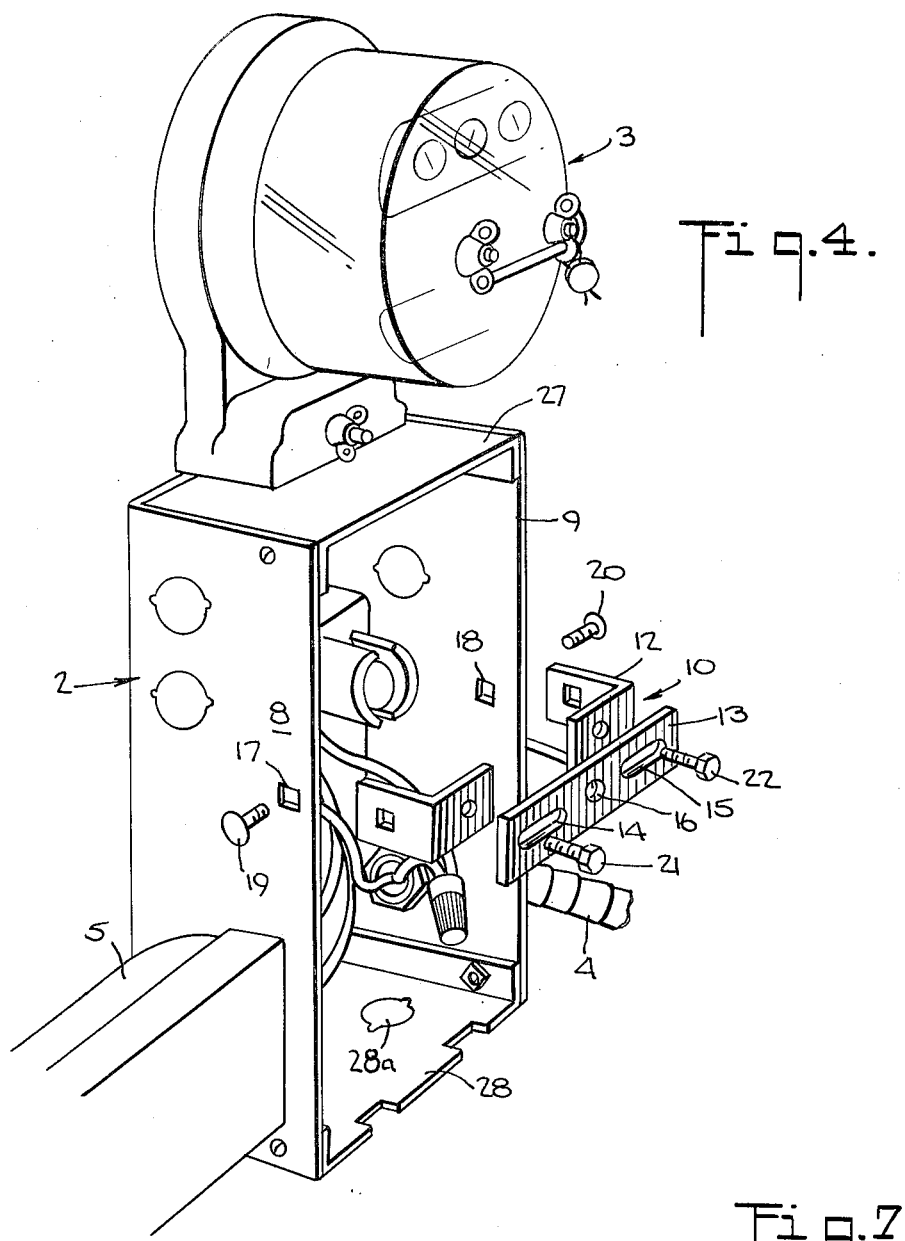
FIG. 4 is an exploded perspective view of the enclosure bracket assembly in association with the electric meter pan of FIG. 1.
Figure 7:
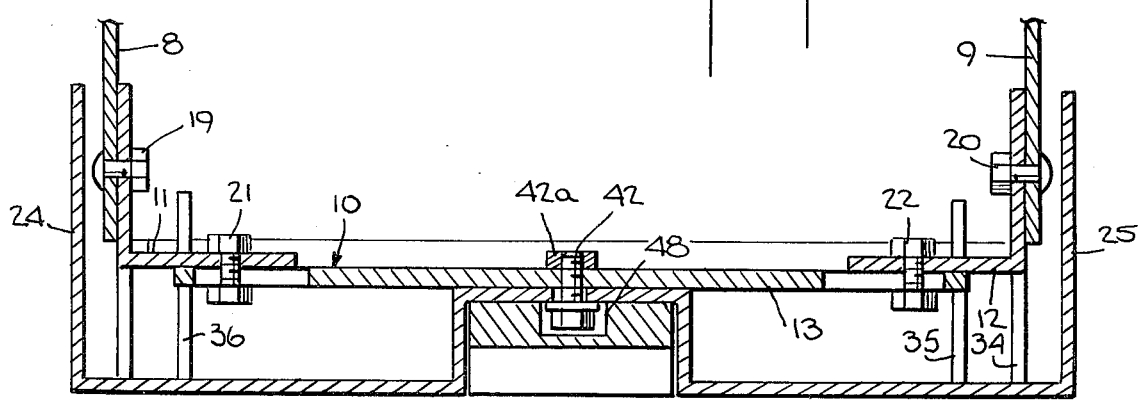
FIG. 7 is a sectional, plan view illustrating the meter pan bracket assembly, the cover and the shield and is taken along the lines 7—7 indicated in FIG. 1.

FIGS. 2 and 3 illustrate the embodiment of FIG. 1 with the cover 6, forming part of the locking assembly 1, removed from the pan 2. The entrance line 4 is connected to the consumer's line and to the meter 3 within the interior of the pan 2 as indicated by the wires 7. Access to the interior of the pan 2 permits reconnection of such wires so as to by-pass the meter 3 and thereby prevent recording of the power consumption by the meter 3. Also, an electrical company employee may discontinue service to a consumer of customer by disconnecting the entrance line 4 from the consumer's lines within the pan 2. Therefore, it is apparent that it is desirable to prevent unauthorized access to the interior of the pan 2.

The locking assembly 1, which has its parts made of heavy gauge metal, preferably hardened steel, to prevent removal thereof by chiseling, bending, etc., is received over the open side of the pan 2 and is secured to the side walls 8 and 9 of the pan 2 by means of a three part adjustable bracket 10 comprising a pair of metal angle members 11 and 12 and a plate 13 having a pair of elongated slots 14 and 15 and a central hole 16 (see FIGS. 3, 6 and 8) with a nut 42a aligned therewith and secured to the plate 13, such as by welding. If the plate 13 has sufficient thickness, the nut 42a may be omitted, the wall of the hole 16 having threads. When the locking assembly 1 is to be installed, a pair of holes 17 and 18 are formed in the side walls 8 and 9 in positions such that the angle members 11 and 12 will have the positions shown in FIG. 2 when they are secured to the walls 8 and 9 by means of bolts 19 and 20 which, preferably, are carriage bolts. The plate 13 is then secured to the angle members 11 and 12 by means of bolts 21 and 22 taking care that the threaded hole 16 is located midway between the walls 8 and 9.

The cover 6 has peripheral skirts 23–26 which extend along the side walls 8 and 9 and the top and bottom walls 27 and 28, respectively, of the pan 2 to prevent insertion of a tool between the cover 6 and the pan 2. Since the pan 2 usually has "knock-outs", such as the "knock-out" 28a, in the bottom wall 28, the skirt 26 has a depth sufficient to cover such "knock-outs", and therefore, usually will have a depth greater than the depth of the skirts 23–25. The depth of the skirt 23 will be limited by the space between the bottom of the meter 3 and the front edge of the top wall 27, and the depth of the skirts 24 and 25 usually will be relatively small, e.g. about one-fourth of the depth of the pan 2, to permit wires, such as the entrance line 4 and the consumer's lines to enter and exit from the pan 2. If the depth of the skirts 24 and 25 is insufficient to cover the heads of the bolts 19 and 20, the skirts 24 and 25 may be provided with ears 29 and 30 which cover such heads.

The skirts 24 and 25 are spaced apart by a distance slightly greater than the distance between the outer sides of the walls 8 and 9 so as to clear the heads of the bolts 19 and 20 but so as to have a close fit with the walls 8 and 9. Similarly, the skirts 23 and 26 are spaced apart so as to have a close fit with the walls 27 and 28. However, the cover 6 may be provided with tabs, such as the tabs 31–37 (see FIGS. 2, 3, 8 and 10) to permit the cover 6 to be used with pans having different sizes, the tabs 31–37 receiving the walls of the pan 2 therebetween in an obvious manner.

The cover 6 has a projecting portion 38 thereon which in turn has a well 38a, and a lip 38b which is disposed to overlie the upper end of a shield 39. The portion 38 has a rear wall 40 with an elongated slot 41 therein for receiving a bolt 42 which may be screwed into the nut 42a on the plate 13. Thus, when the cover 6 is applied over the open side of the pan 2, the cover 6 is then secured to the bracket 10 by means of the bolt 42.

The well 38a has the lip 38b on its uppermost side and three walls 43a, 43b and 43c (FIG. 5) for pivotally receiving shield 39. The shield 39 has a tapered or rounded and beveled top edge 44 for placement under lip 38b. The beveled edge 44 allows clearance for the slide 39 under the lip 38b, so that a pivotal, hinge-like motion of the slide 39 about the beveled edge 44 will position the slide 39 withing the well 38a, flush with the front surface of portion 38.

The other three edges 45a, 45b and 45c (FIGS. 5 and 9) of the shield 39 are flat, like the walls 43a, 43b and 43c of the well 38a to allow a relatively close tolerance fit between the well walls 43a, 43b and 43c and the shield 39. A close tolerance fit will prevent insertion of a tool between the shield 39 and the walls of the well 38a since placement of a chisel or other similar device between the two parts will be difficult.

A locking ring 47 is secured to the inner surface of the wall 40 in any suitable manner, e.g. welding. The shield 39 is employed to prevent unauthorized access to the bolt 42, and when it is placed into the well 38a, the shield 39 covers the bolt 42. The shield 39 has a groove 48 on its underside to receive the head of the bolt 42 and to permit the shield 39 to be pivoted into place. When the shield 39 is in its proper position, an opening 46 therein for receiving a barrel lock 49, such as the barrel lock described in U.S. Pat. No. 4,024,740, is aligned with the opening in the ring 47. The barrel lock 49 may then be inserted through the shield 39 and into the ring 47 to lock the shield 39 in place. An authorized person can gain access to the interior of the pan 2 by merely removing the lock 49 by means of a key (not shown), removing the shield 39 and then removing the bolt 42 and the cover 6. However, due to the construction of the locking assembly 1, it is very difficult for an unauthorized person to forcefully remove the cover 6.

The device is installed as follows: The original cover is removed from the meter pan 2, exposing its interior. Holes 17 and 18 are then punched into opposite sides 8 and 9 of the meter pan 2. The angle members 11 and 12 are bolted inside the meter pan 2 through the punched holes 17 and 18. The center plate 13 is bolted to the angle members 11 and 12, and the plate 13 traverses the front opening of the meter pan 2. The cover 6 is then bolted to the center plate 13 with bolt 42 and the shield 39 is pivoted into well 38a. The barrel lock 49 is inserted through a bore in the shield 39 and engages the locking ring 47 within the cover 6.

Although a preferred embodiment of the present invention has been described and illustrated, it will be apparent to those skilled in the art that various modifications may be made without departing from the principles of the invention. The locking assembly may, of course, be used to protect enclosures other than a meter pan.

What is claimed is:

1. In combination with a utility meter pan which comprises a back wall and outwardly projecting side wall means connected to the back wall to form a receptacle with an open side, a locking assembly for closing said receptacle open side, comprising bracket means extending across the interior of said meter pan, and attached to said side wall means at respective locations on opposite sides of said receptacle open side, a cover covering said receptacle open side and thereby preventing access to the interior of said receptacle, said cover having skirt portions which extend along and closely adjacent to the exterior of said side wall means and covering said locations of attachment of said bracket means, releasable retaining means extending through said cover and securing said cover to said bracket, a shield on said cover in a position covering said retaining means and thereby preventing access thereto, said cover having thereon projecting means defining a well therein, said shield being received in said well of the cover with said projecting means being closely adjacent to the shield, lock receiving means on said shield and said cover, and removable lock means engaging said lock receiving means on said shield and said cover for locking said shield on said cover in its said position covering said retaining means.

2. The combination according to claim 1 wherein said bracket means comprises two end parts, respectively attached at said locations on said side wall means, an adjustable center plate, and retaining means securing said center plate to said end parts.

3. The combination according to claim 1 or 2 wherein said removable lock means is a barrel lock, and wherein said lock receiving means on said cover is a barrel lock retaining ring for receiving an end of said barrel lock, said ring being secured to said cover.

4. The combination according to claim 1 wherein said projecting means defining said well includes lip means, said shield underlying said lip means.

5. The combination according to claim 4 wherein said lip means comprises a lip at one end of said well, said shield having an end which underlies said lip at one end of said well, said end of said shield being tapered to permit said shield to be inserted in said well by pivotal movement of said shield towards and away from said cover.

6. For use in combination with a utility meter pan which comprises a back wall and outwardly projecting side wall means connected to the back wall to form a receptacle with an open side, an assemblable kit of parts comprising a locking cover adapted to cover said receptacle open side to thereby prevent access to the interior of said receptacle, bracket means adapted to extend across the interior of said meter pan, and to be secured to said side wall means at respective locations on opposite sides of said receptacle open side, said cover having skirt portions adapted to extend along and closely adjacent to the exterior of said side wall means and to cover said intended locations of attachment of said bracket means when said cover is mounted on said receptacle open side, releasable retaining means adapted to extend through said cover and to secure said cover to said bracket means, a shield adapted for positioning on said cover in a position to cover said retaining means and thereby prevent access to said retaining means, said cover having thereon projecting means defining a well therein to receive said shield with said projecting means being closely adjacent to said shield, lock receiving means on said shield, lock receiving means on said cover, and removable lock means adapted to engage said lock receiving means on said shield and said cover for locking said shield on said cover in its said position covering said retaining means.

7. An assemblable kit of parts according to claim 6 wherein said bracket means comprises a pair of end parts including means adapted for securing said end parts respectively to said side wall means at said locations on opposite sides of said receptacle open side, a center plate, and means for securing said center plate to and between said end parts, said center plate and end parts being adapted for adjustment of the length of said bracket means.

8. An assemblable kit of parts according to claim 6 or 7 wherein said removable lock means is a barrel lock, and wherein said lock receiving means on said cover is a barrel lock retaining ring for receiving an end of said barrel lock.

9. An assemblable kit of parts according to claim 7 wherein said cover further has tab means parallel to, and spaced inwardly from said skirt means to extend along and closely adjacent to the exterior of such side wall means of a similar but smaller sized receptacle.

10. An assemblable kit of parts according to claim 6 wherein said projecting means defining said well in said cover includes lip means adapted to closely overlie said shield when said shield is in its said position on said cover.

11. An assemblable kit of parts according to claim 10 wherein said cover well has four walls for receiving said shield within said well with said walls covering the sides of said shield, and wherein said lip means is a lip at one end of said well, said shield being tapered to permit said shield to be inserted in said well, with an end thereof beneath said lip, using pivotal movement of said shield towards and away from said cover.

* * * * *